No. 634,611. Patented Oct. 10, 1899.
J. W. BUTTS.
LUGGAGE CARRIER.
(Application filed Mar. 4, 1899.)
(No Model.)

Witnesses:
J. D. Garfield
M. A. Campbell

Inventor,
John W. Butts
by Wm. F. Bellows
Attorney.

UNITED STATES PATENT OFFICE.

JOHN W. BUTTS, OF SPRINGFIELD, MASSACHUSETTS.

LUGGAGE-CARRIER.

SPECIFICATION forming part of Letters Patent No. 634,611, dated October 10, 1899.

Application filed March 4, 1899. Serial No. 707,755. (No model.)

*To all whom it may concern:*

Be it known that I, JOHN W. BUTTS, a citizen of the United States of America, and a resident of Springfield, in the county of Hampden and State of Massachusetts, have invented certain new and useful Improvements in Luggage-Carriers, of which the following is a full, clear, and exact description.

This invention relates to improvements in luggage-carriers for bicycles, the object of the invention being to provide a luggage-carrier which is capable of being applied on the vehicle in such a manner as to distribute the weight of the load throughout different parts of the frame, relieving much of the strain at the head of the machine, and, furthermore, to render the members of the luggage-carrier which directly support the load capable of being when not in use disposed closely alongside a suitable part of the bicycle-frame.

Another object of the invention is to construct the luggage-carrier in such a manner that it may be applied on the frames of bicycles of different lengths.

The invention consists in constructions and combinations of parts, all substantially as hereinafter fully described, and set forth in the claims.

Reference is to be had to the accompanying drawings, in which this invention is illustrated as carried out in application on a bicycle having a diamond-shaped frame and on a bicycle for ladies, and in said drawings—

Figure 1:
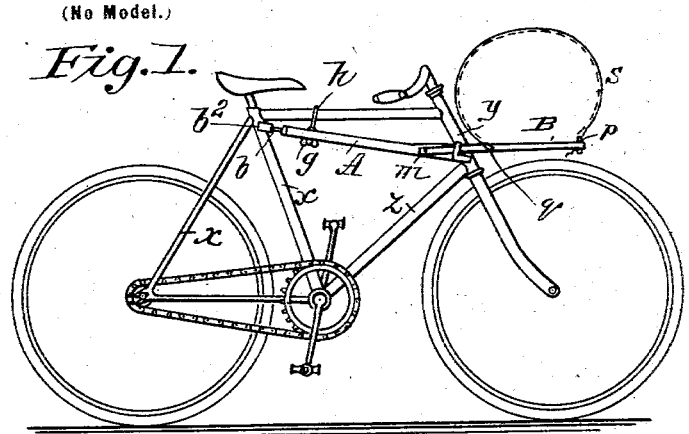
Figure 2:
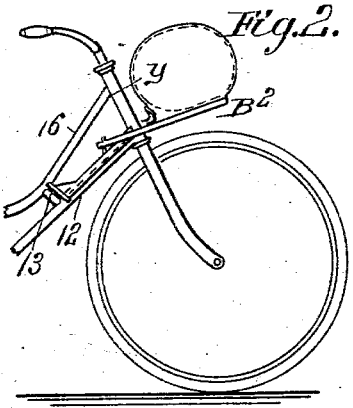
Figure 3:
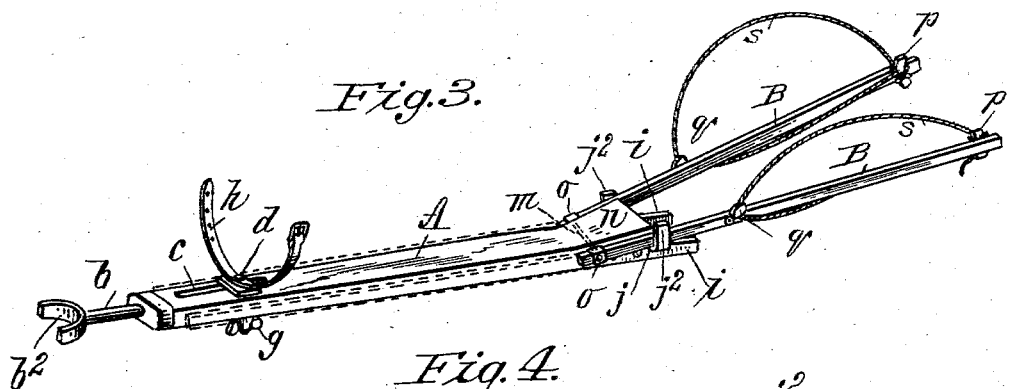
Figure 4:
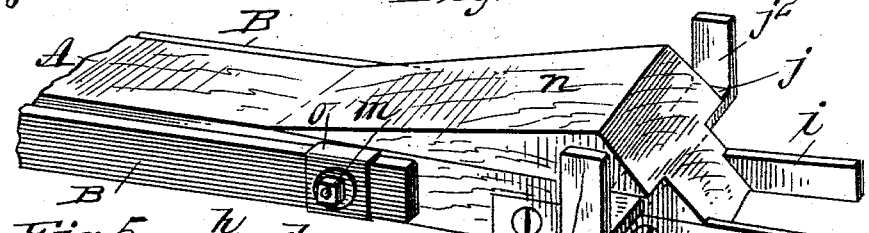
Figure 5:
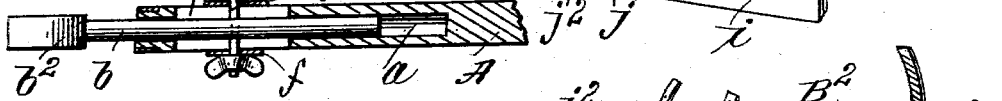
Figure 6:
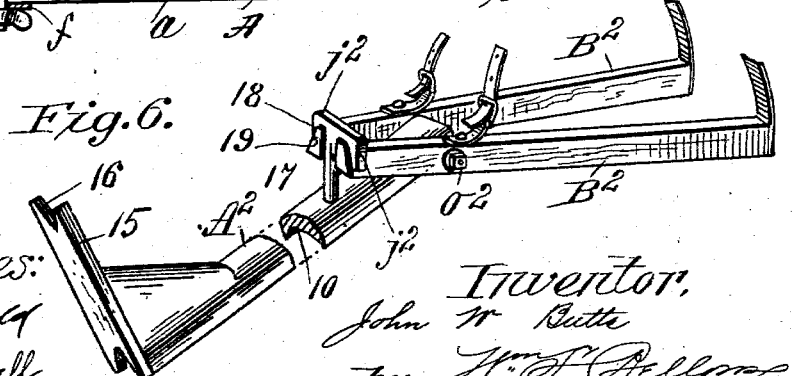

Figure 1 represents a side view of a bicycle having a diamond frame and showing the luggage-carrier mounted thereon and arranged for use. Fig. 2 is a side elevation of the forward part of a lady's wheel sufficient to show the combination therewith of the luggage-carrier suitably constructed therefor. Fig. 3 is a perspective view of the luggage-carrier in the form shown in Fig. 1. Fig. 4 is a perspective view on a larger scale for illustrating details of construction of a part of the carrier. Fig. 5 is a longitudinal sectional view of the distensible portion of the luggage-carrier shown in Fig. 3. Fig. 6 is a perspective view of the luggage-carrier for ladies' wheels.

Similar characters of reference indicate corresponding parts in all of the views.

I will first describe in detail the luggage-carrier designed to be mounted and used on a bicycle having the most common form of diamond frame, reference to be had to Figs. 1, 3, 4, and 5.

A represents a bar having longitudinally therewithin at its rear end portion the rearwardly-opening socket $a$ and having the slot $e$, extending through the bar near its rear end from top to bottom, intersecting said passage or socket $a$. $b$ represents a rod longitudinally and adjustably movable in said socket, the same at its rear end being provided with the yoke or fork $b^2$ to engage the upright frame member $x$.

$d$ represents a bolt engaging through an intermediate part of the rod $b$, the same being capable of sliding along in the slot $e$, washers $ff$ surrounding the upper and lower extremities of the bolt, such washers lying on the upper and lower surfaces of the bar, and the lower end of the bolt is screw-threaded, receiving thereon the thumb-nut $g$, the head of the bolt confining between it and the adjacent washer an intermediate portion of the strap $h$.

The forward end of the bar A is bifurcated, having the opposite side members $i\ i$ to straddle and engage the head $y$ of the bicycle-frame at its portion adjacent the junction therewith of the under upwardly and forwardly extending frame member $z$, the forward end portion of the bar A being supported by said frame member $z$. The forward extremity of the bar is provided at opposite sides with the transverse rests $j$, having at their outer ends the upwardly-projecting guard-lugs $j^2$. Near the forward end of the said bar A the load-supporting paired bars B B are pivotally connected, $m$ representing the common pivot-bolt therefor, and when the carrier is in use these bars are swung to occupy the positions of projection forward of the head and with some divergence, as indicated in Fig. 2, such bars having stable support both on the pivot-bolt $m$, on which they are adapted to swing, and on the rests $j\ j$, forwardly onto which they are swung. The forward end of the bar has at its upper part the slightly forwardly inclining widened portion $n$, which serves as the bars B B are swung forwardly to cause them to have divergent relations, as shown, the connection of said bars B B with the supporting and pivot bolt allowing a slight though sufficient degree of play of the bars laterally relative to the plane of swinging movement.

For purposes of durability and strength I surround the end portions of the bars B B, through which the bolt $m$ is passed, with straps or oblated sleeves $o$.

The forward ends of the extension and support bars B B are provided with cleats $p$, while on rearward portions of said bars sheaves $q$ are provided. A cord $s$ is by its one end secured to each cleat and passes thence through the sheave and when not in use has its end returned to and stayed by engagement with the cleat. These cords properly slackened are available for securing a basket, bundle, or other receptacle or article to be carried on the supporting extension-arms B B, it being understood that the cords after being brought to encircling relations around the load are suitably secured either to the cleats or to the bars themselves, and in lieu of the fastening devices, consisting of the cords, cleats, and sheaves, some other form of securing means may be employed.

As I have constructed and used this luggage-carrier in the form shown and as described, when the bar A is engaged on and adjusted lengthwise to the frame of the machine no other clips or fastenings have been found necessary, it being understood that in placing the bar A in engagement on the frame in the position shown in Fig. 1 the thumb-nut $g$ is first loosened, so that the engagement parts $b^2$ and $i$ $i$ may be brought into their proper relations to the frame member $x$ and the member $y$ at the junction of the one $z$ therewith, and then the rod $b$ is forced endwise as far as possible, whereupon the nut $g$ is tightened.

When the luggage-carrier is not to be used as such, the cords $s$ $s$ are drawn closely alongside the bars B B, and the latter are swung backwardly alongside the main support-bar A, and at such time the strap $h$ is utilized to hold such bars B B closely alongside bar A and against falling downwardly.

In the form of the luggage-carrier which has been described in detail the same is capable of receiving quite heavy loads, the weight thereof being ultimately sustained by the frame of the bicycle with more or less distribution of the weight and strains at the rear of the frame, so that the head of the machine is relieved, the poise of the vehicle being the better maintained and the steering thereof more easily performed.

The form of the luggage-carrier which I have devised and applied in use on ladies' wheels illustrated in Figs. 2 and 6 possesses features of invention in common with the carrier shown in Figs. 1 and 3 in that it comprises a supporting-bar $A^2$ to be mounted on the frame, with the forwardly-extending support-bars $B^2$ $B^2$, pivotally mounted on the bar $A^2$, adapted to be swung forwardly therefrom to extend in advance of the head and having provided therefor stops $j^2$ $j^2$ for sustaining the load-supporting bars against giving away under the weight imposed thereon. In this form of the device the main bar $A^2$ is concave on its under side, as indicated at 10, to fit the lower frame member 12 of the ladies' wheel next back of the head, it lying between the head $y$ and the stay or reinforce 13, and at its rear end the bar $A^2$ has the angular extension 15 with the crotched end 16, the part 15 lying along in front of the reinforcing part 13 of the frame, while the crotched extremity thereof engages the upper frame member 16. In this form of the carrier the extension-bars $B^2$ are pivoted intermediately of their ends at the forward end of the main supporting appliance $A^2$, so that when these bars are swung into their forwardly-extended positions the rear end portions thereof behind their place of pivotal support at $o^2$ engage under the cross-arms of the upstanding T-shaped part 17, which cross-arms constitute the stops or rests corresponding to those $j$ in the form of the luggage-carrier illustrated in Fig. 3.

The inner depending members of the cross-arm extremity are inclined and the sides of the rear portions of the bars $B^2$ are likewise inclined or beveled, so that when these inclined parts (indicated at 18 and 19) are brought into engagement the rear ends of the support-bars $B^2$ are drawn together, the forward ends being caused to assume divergent relations, thereby constituting a suitably-widened support for the bundle or receptacle to be carried, suitable play at the pivotal connection at $o^2$ being permitted for this lateral disposition of the support-bar for the purpose explained.

I may, if desired, provide clips or clamps of an ordinary character for holding the main bar A or $A^2$ of the carriers on the frame, but such I should not consider to involve invention and do not deem illustration thereof necessary.

I do not limit myself to the use of any particular material or combinations of materials in the construction of my improved luggage-carrier.

Having thus described my invention, what I claim, and desire to secure by Letters Patent, is—

1. In a luggage-carrier for a bicycle, an appliance to be mounted on the frame of the vehicle, provided with support-bars pivotally mounted thereon adapted to be swung forwardly to extend approximately horizontally in advance of the head of the vehicle, and stops or rests provided on the frame-supported appliance for sustaining the support-bars against giving way under the weight of the load imposed thereon, substantially as described.

2. In a luggage-carrier for a bicycle, an appliance to be mounted on the frame of the vehicle at the rear of the head thereof, provided with support-bars pivotally mounted thereon, adapted to be swung forwardly to extend approximately horizontally in advance of the head, means for causing said bars to be also forwardly inclined outwardly, and rests or stops provided on the frame-supported appliance for limiting the support-bars to sustain the load thereon.

3. In a luggage-carrier for a bicycle, the bar A having at its forward end means for engagement with a forward part of the bicycle-frame, and having its rear portion constructed with a longitudinally-distensible member and means for adjustably confining it, and having the rests $j\,j$ provided at opposite sides of its forward portion, combined with which are the support-bars B B having end portions thereof pivoted to the said bar A and adapted to be supported on said rests, and also adapted to be swung rearwardly closely alongside said bar A when not in use.

4. In a luggage-carrier, the bar A having at its forward end means for engagement with a forward part of the bicycle-frame and provided with the transversely-extending rests $j\,j$, and having its rear end constructed with the longitudinal socket $a$ and the cross-slot intersecting same, the rod $b$ endwise movable in said socket and provided at its rear end with a frame-engaging device, the bolt engaged through said rod $b$ and playing endwise in said slot, and having a confining-nut on its extremity, supporting members pivotally mounted on said bar A at a point to the rear of said rests and extending forwardly of the head of the machine, and provided with fastening appliances for confining the load thereon, substantially as described.

5. In a luggage-carrier, the bar A having at its forward end the separated members $i\,i$, the forwardly-widened inclined portion $n$, and the transversely-extending rests $j\,j$ provided with the upturned lugs $j^2$, and having its rear portion constructed with a longitudinally-distensible member formed with a part to engage a rear portion of the frame, and means for adjustably confining said member, and the support-bars B B having their rear end portions pivoted to said bar A to the rear of the rests $j$ and adapted in their forward extension to be supported by such rests and in divergent relations, as described and shown.

6. In a luggage-carrier, the bar A having its forward end constructed with the fork-like members $i\,i$, and the lateral rests $j\,j$, and having its rear end constructed with the longitudinal socket and intersecting slot, the rod playing in said socket and provided with the fork or yoke $b^2$, the bolt having a slide movement in said slot engaging through said rod, provided with the thumb-nut and having engaged therewith the strap $h$, and the supporting arms or bars B B having their rear ends pivotally connected to a forward end portion of the bar A, but at a point to the rear of the lateral rests, and adapted to be extended from their points of pivotal connection forwardly opposite each other beyond the head of the bicycle-receiving support by said rests, and also adapted to be swung rearwardly closely alongside the bar A to be confined by said strap, and said bars B B being provided with the cleats, sheaves and fastening-cords, all substantially as described and shown.

JOHN W. BUTTS.

Witnesses:
WM. S. BELLOWS,
M. A. CAMPBELL.